United States Patent
Yang et al.

(10) Patent No.: US 9,471,497 B2
(45) Date of Patent: Oct. 18, 2016

(54) METHODS FOR COMBINING ACCESS HISTORY AND SEQUENTIALITY FOR INTELLIGENT PREFETCHING AND DEVICES THEREOF

(71) Applicant: NetApp, Inc., Sunnyvale, CA (US)

(72) Inventors: Suli Yang, Madison, WI (US); Kishore Kasi Udayashankar, San Jose, CA (US); Jingxin Feng, San Jose, CA (US); Swetha Krishnan, Sunnyvale, CA (US); Kiran Srinivasan, Sunnyvale, CA (US)

(73) Assignee: NetApp, Inc., Sunnyvale, CA (US)

(*) Notice: Subject to any disclaimer, the term of this patent is extended or adjusted under 35 U.S.C. 154(b) by 314 days.

(21) Appl. No.: 14/164,077

(22) Filed: Jan. 24, 2014

(65) Prior Publication Data
US 2015/0212943 A1 Jul. 30, 2015

(51) Int. Cl.
*G06F 12/00* (2006.01)
*G06F 12/08* (2016.01)
*G06F 17/30* (2006.01)
*G06F 12/12* (2016.01)
*H04L 29/08* (2006.01)

(52) U.S. Cl.
CPC ..... *G06F 12/0862* (2013.01); *G06F 17/30132* (2013.01); *G06F 12/0866* (2013.01); *G06F 12/12* (2013.01); *G06F 2212/1016* (2013.01); *G06F 2212/314* (2013.01); *G06F 2212/502* (2013.01); *G06F 2212/602* (2013.01); *G06F 2212/6024* (2013.01); *H04L 67/2852* (2013.01)

(58) Field of Classification Search
None
See application file for complete search history.

(56) References Cited

U.S. PATENT DOCUMENTS

| 6,195,622 | B1  |   | 2/2001 | Altschuler et al. |
|-----------|-----|---|--------|-------------------|
| 6,385,641 | B1  | * | 5/2002 | Jiang ............ H04L 29/06 709/203 |
| 9,239,794 | B1  | * | 1/2016 | Merchant ........ G06F 12/0862 |
| 2014/0108740 | A1 | * | 4/2014 | Rafacz .......... G06F 12/0862 711/137 |

OTHER PUBLICATIONS

Vora et al., "An Hoarding Approach for Supporting Disconnected Write Operations in Mobile Environments," Reliable Distributed Systems, Proceedings of the 23rd IEEE (SRDS '04) pp. 276-288 (2004).
International Search Report and Written Opinion for corresponding application No. PCT/US14/66593 mailed Mar. 9, 2015.

(Continued)

*Primary Examiner* — Prasith Thammavong
*Assistant Examiner* — Jason Blust
(74) *Attorney, Agent, or Firm* — Gilliam IP PLLC (57) ABSTRACT

A method, non-transitory computer readable medium, and device that prefetchs includes identifying a candidate data block from one of one or more immediate successor data blocks. The identified candidate data block has a historical access probability value from an initial accessed data block which is higher than a historical access probability value for each of the other immediate successor data blocks and is above a prefetch threshold value. The identifying is repeated until a next identified candidate data block has the historical access probability value below the prefetch threshold value. In the repeating, the identifying next immediate successor data blocks is from the previously identified candidate data block and the historical access probability value for each of the next immediate successor data blocks is determined from the originally accessed data block. The identified candidate data block with the historical access probability value above the prefetch threshold value is fetched.

18 Claims, 5 Drawing Sheets

(56) References Cited

OTHER PUBLICATIONS

Kroeger et al., "Design and Implementation of a Predictive File Prefetching Algorithm," Usenix Association, Proceedings of the 2001 USENIX Annual Technical Conference, Boston, MA, 15 pp., Jun. 25-30, 2001.

Jiang et al., "A Prefetching Scheme Exploiting both Data Layout and Access History on Disk," ACM Transactions n Storage, vol. 9, No. 4, Article 39, 21 pp. (Mar. 2010).

Griffioen et al., "Reducing File System Latency Using a Predictive Approach," Department of Computer Science, University of Kentucky, Lexington, KY, 11 pp. (1994).

Gill et al., "AMP Adaptive Multi-stream Prefetching in a Shared Cache," USENIX Association, FAST '07: 5th Usenix Conference on File and Storage Technologies, pp. 185-198 (2007).

Amer, A.M., "Predictive Data Grouping Using Successor Prediction," Dissertation for University of California Santa Cruz, 150 pp. (Sep. 2002).

* cited by examiner

METHODS FOR COMBINING ACCESS HISTORY AND SEQUENTIALITY FOR INTELLIGENT PREFETCHING AND DEVICES THEREOF

This technology relates to methods for combining access history and sequentiality for intelligent prefetching and devices thereof.

BACKGROUND

Prefetching is a technique to fetch data ahead of time before the input/output (I/O) access request for that data arrives so that the cost of a cache miss, e.g. having to fetch data in the I/O path, can be avoided. Prefetching can be classified into two broad categories: (1) sequential prefetching; and (2) history based prefetching. One other dimension in prefetching is to determine the amount of data to be prefetched. While sequential prefetching works well for workloads that are dominated by sequential accesses, history-based prefetching is useful for workloads that have random data accesses and repeating patterns of accesses.

Existing prefetching techniques primarily do sequential prefetching. Though simple and effective, in the context of caching for cloud storage, given variable and high latency accesses over a WAN network, they are not efficient. These techniques cannot capture or exploit semantic correlation across random accesses. Examples of these semantic-correlations include inter-file dependencies, file metadata and data accesses, database indices and table data. Moreover, in the case of cloud storage caching, the penalty for a wrong prefetch decision is very high in terms of both performance and cost.

There also are several history-based prefetching schemes that are file-based, such as "Design and Implementation of a Predictive File Prefetching Algorithm" by Kroeger et. al. that uses a technique called Extended Partition Context Modelling which takes into account the prefetch lead time. Another similar technique has been proposed by Griffieon et. al. in "Reducing File System Latency using a Predictive Approach," which uses a "lookahead period" as the criterion to relate file accesses. But these approaches are coarse-grained since they are based on files not blocks, and also do not consider important factors such as prefetch wastage and cost of a prefetch. Working at a file granularity has several drawbacks: a) metadata prefetching is not possible if the metadata of the file system is not stored in the form of files, and b) prefetching cost is increased due to "prefetch wastage" by bringing into the cache the entire file's data even though some of the blocks of the file may not be seen in the client's request stream. Also, most history-based prefetching schemes are not adaptive and do not dynamically vary the amount of data to prefetch and what data to prefetch, but use a coarse-grained fixed threshold to cut off what to bring into the cache.

Another approach is discussed in "A Prefetching Scheme Exploiting Both Data Layout and Access History on the Disk" by Song et al. This approach functions at block-granularity and also takes into account history information. However, while this system tries to minimize the penalty of a mis-prefetch, it does not adapt it with a heuristic, but simply uses a boundary for the mis-prefetch percent to continue or stop prefetching altogether. It is also not sensitive to the time of prefetch, e.g., when to initiate a prefetch such that cache hits are maximized without incurring wasted prefetches.

Yet another approach constructs and uses an access history graph and is described in U.S. patent application Ser. No. 13/951,662, entitled, "Systems and Methods for Adaptive Prefetching, which is herein incorporated by reference in its entirety.

SUMMARY

A method for prefetching includes identifying, with a caching and prefetching computing device, at least one candidate data block from one of one or more immediate successor data blocks. The identified at least one candidate data block has a historical access probability value from an initial accessed data block which is higher than a historical access probability value for each of the other immediate successor data blocks and is above a prefetch threshold value. The identifying is repeated, with the caching and prefetching computing device, until a next identified candidate data block has the historical access probability value below the prefetch threshold value. In the repeating, the identifying one or more next immediate successor data blocks is from the previously identified candidate data block and the historical access probability value for each of the next immediate successor data blocks is determined from the originally accessed data block. The one or more identified candidate data blocks with the historical access probability value above the prefetch threshold value are fetched, with the caching and prefetching computing device, from one or more storage media for storage in cache.

A non-transitory computer readable medium having stored thereon instructions for managing prefetching comprising executable code which when executed by a processor, causes the processor to perform steps including identifying at least one candidate data block from one of one or more immediate successor data blocks. The identified at least one candidate data block has a historical access probability value from an initial accessed data block which is higher than a historical access probability value for each of the other immediate successor data blocks and is above a prefetch threshold value. The identifying is repeated until a next identified candidate data block has the historical access probability value below the prefetch threshold value. In the repeating, the identifying one or more next immediate successor data blocks is from the previously identified candidate data block and the historical access probability value for each of the next immediate successor data blocks is determined from the originally accessed data block. The one or more identified candidate data blocks with the historical access probability value above the prefetch threshold value are fetched from one or more storage media for storage in cache.

A caching and prefetching computing device includes a memory coupled to a processor configured to execute programmed instructions stored in the memory including identifying at least one candidate data block from one of one or more immediate successor data blocks. The identified at least one candidate data block has a historical access probability value from an initial accessed data block which is higher than a historical access probability value for each of the other immediate successor data blocks and is above a prefetch threshold value. The identifying is repeated until a next identified candidate data block has the historical access probability value below the prefetch threshold value. In the repeating, the identifying one or more next immediate successor data blocks is from the previously identified candidate data block and the historical access probability value for each of the next immediate successor data blocks is determined from the originally accessed data block. The one or more identified candidate data blocks with the historical access probability value above the prefetch threshold value are fetched from one or more storage media for storage in cache.

This technology provides a number of advantages including providing methods, non-transitory computer readable medium and devices for combining access history and sequentiality for more intelligent prefetching. This technology is able to leverage I/O access history to discover patterns and intelligent prefetching techniques to overcome prior issues with prefetching. Additionally, this technology reduces prefetch cost and prevents limited resources in a system from caching data that may not be immediately used. Further, this technology captures both sequential accesses in the workload as well as semantic correlation between random accesses.

DETAILED DESCRIPTION

Figure 1:
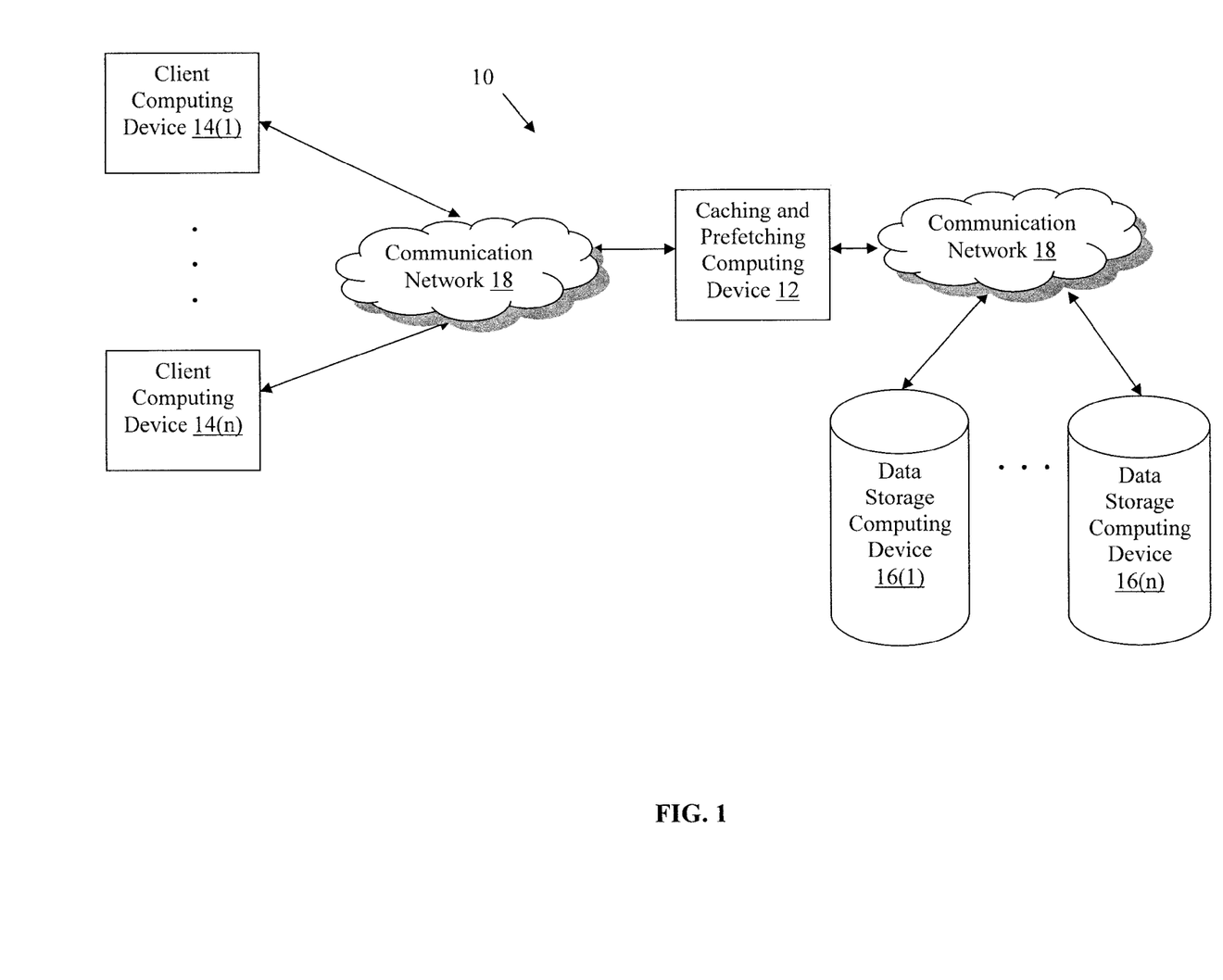
FIG. 1 is a block diagram of an environment with an exemplary caching and prefetching computing device.
Figure 2:
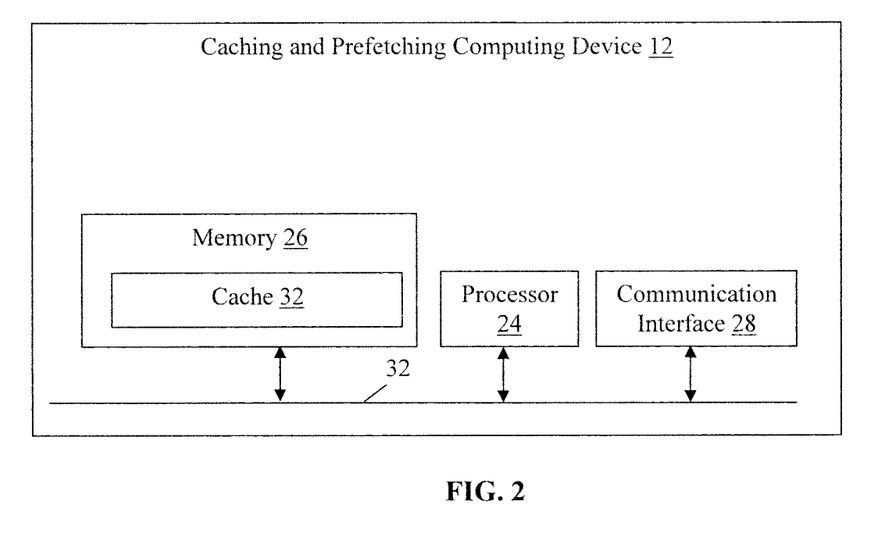
FIG. 2 is a block diagram of the exemplary caching and prefetching computing device shown in FIG. 1.

An environment 10 with an exemplary caching and prefetching computing device 12 is illustrated in FIGS. 1-2. In this particular example, the environment 10 includes the caching and prefetching computing device 12, client computing devices 14(1)-14(n), and data storage devices 16(1)-16(n) coupled via one or more communication networks 18, although the environment could include other types and numbers of systems, devices, components, and/or other elements. In this example, the method for prefetching is executed by the caching and prefetching computing device 12 although the approaches illustrated and described herein could be executed by other systems and devices. The environment 10 may include other types and numbers of other network elements and devices, such as cluster fabric switching technology and one or more routers and/or switches by way of example only, as is generally known in the art and will not be illustrated or described herein. This technology provides a number of advantages including providing methods, non-transitory computer readable medium and devices for combining access history and sequentiality for more intelligent prefetching.

Referring more specifically to FIGS. 1-2, in this example the caching and prefetching computing device 12 includes a processor 24, a memory 26 with a cache 32, and a communication interface 28 which are coupled together by a bus 32, although the caching and prefetching computing device 12 may include other types and numbers of elements in other configurations.

The processor 24 of the caching and prefetching computing device 12 may execute one or more programmed instructions stored in the memory 26 for combining access history and sequentiality for intelligent prefetching as illustrated and described in the examples herein, although other types and numbers of functions and/or other operation can be performed. The processor 24 of the caching and prefetching computing device 12 may include one or more central processing units and/or general purpose processors with one or more processing cores, for example.

The memory 26 of the caching and prefetching computing device 12 stores the programmed instructions and other data for one or more aspects of the present technology as described and illustrated herein, although some or all of the programmed instructions could be stored and executed elsewhere. A variety of different types of memory storage devices, such as a random access memory (RAM) or a read only memory (ROM) in the system or a floppy disk, hard disk, CD ROM, DVD ROM, or other computer readable medium which is read from and written to by a magnetic, optical, or other reading and writing system that is coupled to the processor 24, can be used for the memory 26. In this example, the memory 26 further includes a cache 32 whose functions with respect to I/O requests, prefetching and other operations is illustrated and described with the examples herein.

The communication interface 28 of the caching and prefetching computing device 12 operatively couples and communicates between the traffic management device 12, the client computing devices 14(1)-14(n), and data storage computing devices 16(1)-16(n), which are all coupled together by the communication networks 18, although other types and numbers of communication networks or systems with other types and numbers of connections and configurations to other devices and elements. By way of example only, the communication networks 18 can use TCP/IP over Ethernet and industry-standard protocols, including NFS, CIFS, SOAP, XML, LDAP, and SNMP, although other types and numbers of communication networks, can be used. The communication networks 18 in this example may employ any suitable interface mechanisms and network communication technologies, including, for example, any local area network, any wide area network (e.g., Internet), teletraffic in any suitable form (e.g., voice, modem, and the like), Public Switched Telephone Network (PSTNs), Ethernet-based Packet Data Networks (PDNs), and any combinations thereof and the like.

In this example, each of the client computing devices 14(1)-14(n) and each of the data storage computing devices 16(1)-16(n) includes a processor, a memory, and a communication interface, which are coupled together by a bus or other link, although other numbers and types of devices and/or nodes as well as other network elements could be used. The client computing devices 14(1)-14(n) may run applications that may provide an interface to make requests for and receive content, such as data blocks, web pages, applications, and/or other information hosted by one or more of the data storage computing devices 16(1)-16(n) or other storage media. The data storage computing devices 16(1)-16(n) may store and provide content or other network resources in response to requests from the client computing devices 14(1)-14(n) via the communication networks 18, for example, although other types and numbers of storage media in other configurations could be used. In particular, the data storage computing devices 16(1)-16(n) may each comprise various combinations and types of storage hardware and/or software and represent a system with multiple data storage computing devices in a data storage pool, which may include internal or external networks. Various network processing applications, such as CIFS applications, NFS applications, HTTP Web Data storage computing device applications, and/or FTP applications, may be operating on the data storage computing devices 16(1)-16(n) and transmitting data (e.g., files or web pages) in response to requests from the client computing devices 14(1)-14(n).

Although the exemplary network environment 10 with the traffic management device 12, client computing devices 14(1)-14(n), data storage computing devices 16(1)-16(n), and communication networks 18 are described and illustrated herein, other types and numbers of systems, devices, components, and elements in other topologies can be used. It is to be understood that the systems of the examples described herein are for exemplary purposes, as many variations of the specific hardware and software used to implement the examples are possible, as will be appreciated by those skilled in the relevant art(s).

In addition, two or more computing systems or devices can be substituted for any one of the systems or devices in any example. Accordingly, principles and advantages of distributed processing, such as redundancy and replication also can be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic media, wireless traffic networks, cellular traffic networks, G3 traffic networks, Public Switched Telephone Network (PSTNs), Packet Data Networks (PDNs), the Internet, intranets, and combinations thereof.

The examples may also be embodied as a non-transitory computer readable medium having instructions stored thereon for one or more aspects of the present technology as described and illustrated by way of the examples herein, as described herein, which when executed by the processor, cause the processor to carry out the steps necessary to implement the methods of this technology as described and illustrated with the examples herein.

Figure 3:
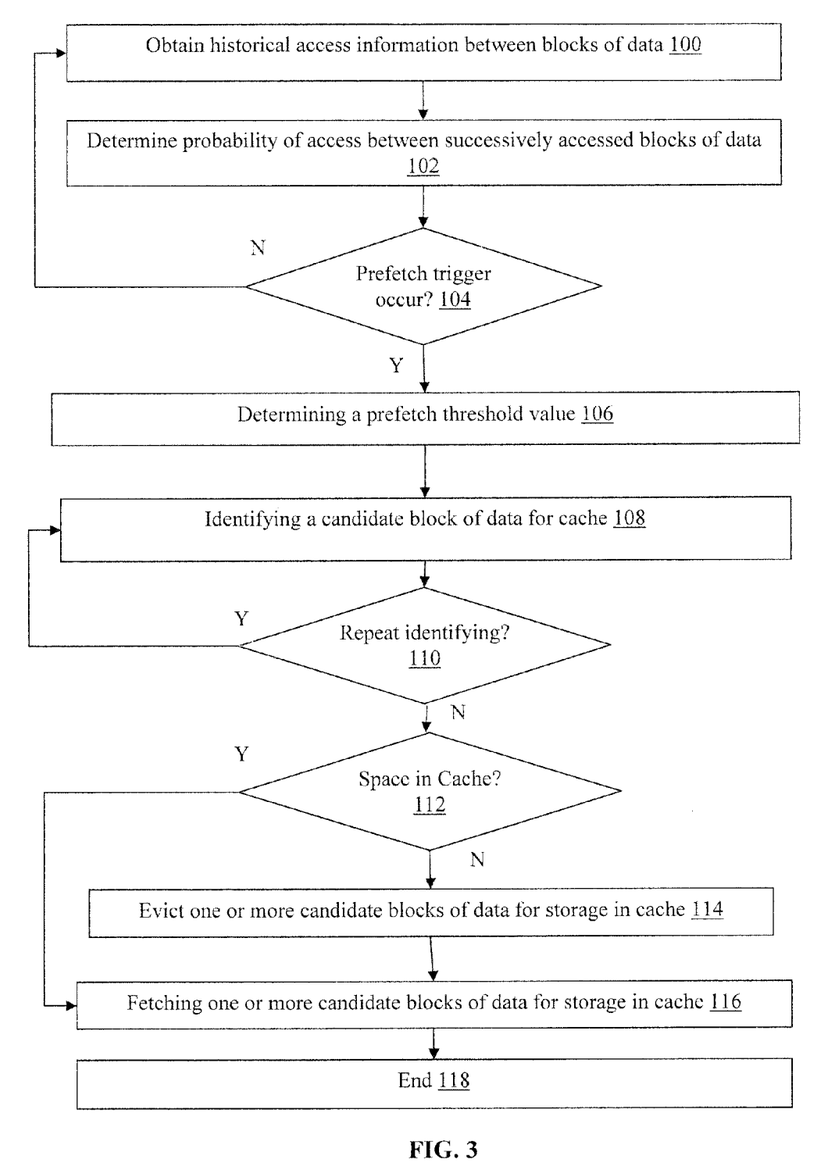
FIG. 3 is a flow chart of an example of a method for combining access history and sequentiality for intelligent prefetching.

An exemplary method for combining access history and sequentiality for intelligent prefetching will now be described with reference to FIGS. 1-4D. Referring more specifically to FIG. 3, in step 100 in this example, the caching and prefetching computing device 12 obtains historical access data between data blocks in an entire or overall block range of data. Next, in step 102 the caching and prefetching computing device 12 determines a probability of access value between the data blocks which were successively accessed. An illustrative example of obtaining this historical access data and determining the probability of access value between the data blocks which were successively accessed will now be described below.

At a higher level, nodes in the graphs in the examples shown in FIGS. 4A-4D represent block ranges of data and the edges between two nodes represent the likelihood (probability) of an access to one node following an access to the other node.

The sequential nature of accesses is represented in two ways in these graphs. First, each node represents access to a block range of data and the graphs captures accesses to nodes, i.e. consecutive block ranges of data. Second, in the history graph, two nodes that represent consecutive block ranges of data are inherently connected by a pseudo edge, i.e. a default probability of 1. This edge represents sequentiality in the block range of data, but is pseudo in nature as this access pattern has not been seen until this point in time.

Figure 4A:
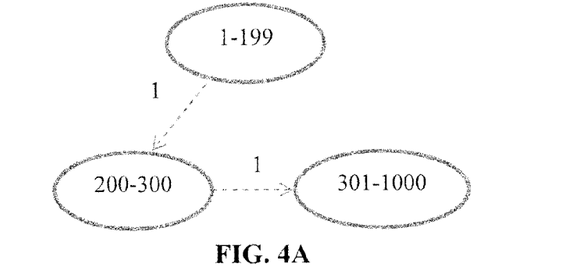
FIGS. 4A-4D are graphs of examples of access history, semantic distance, and probabilities of access between sequentially accessed data blocks.
Figure 4B:
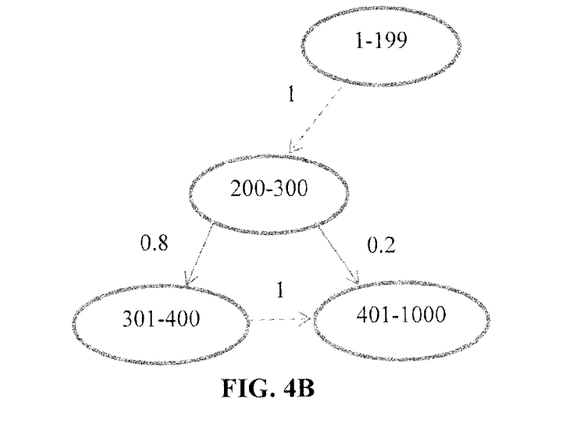
Figure 4C:
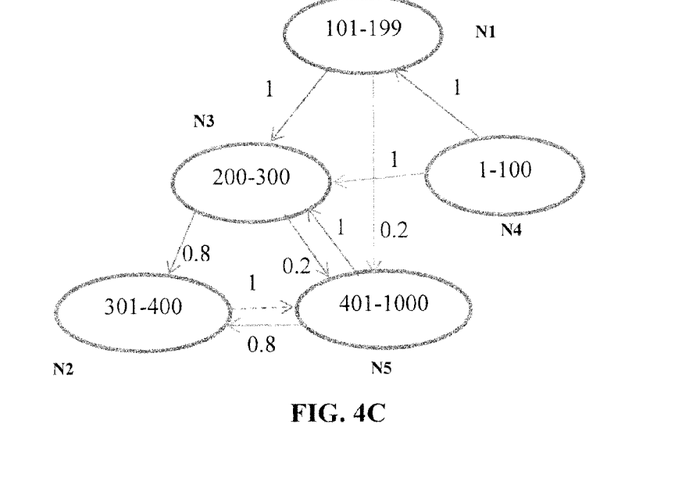

At the start when there are no I/O accesses yet, there is just one node in the graph representing the entire block range in a storage container. In this particular example, the entire or overall block range of data is [1-1000]. If an access is made to block range of data [200-300], then the node [1-1000] is split into three nodes: block ranges of data [1-199], [200-300], and [301-1000] as shown in FIG. 4A. Notice that the pseudo edge from the block range of data [200-300] to the block range of data [301-1000] is labeled with a probability of 1 because the access to the block range of data [200-300] is as if the original contiguous block range of data has been split into three consecutive sequential block ranges of data, which are accessed in succession. In future, if there are four accesses from the block range of data [200-300] to the block range of data [301-400], and one access from the block range of data [200-300] to the block range of data [401-1000], then the pseudo edge is replaced with the actual probability of access as computed from the access counts seen (4/5 and 1/5). Please note the pseudo edge between the block range of data [301-400] and the block range of data [401-1000] is labeled with a probability of 1 to indicate sequentiality and is shown in 4B. By way of example only, approaches for splitting a node and deleting a node are described in U.S. patent application Ser. No. 13/951,662, entitled, "Systems and Methods for Adaptive Prefetching, which again is herein incorporated by reference in its entirety.

Edges in the graphs shown in FIGS. 4A-4D represent the likelihood of access to a node following an access to its parent node. Another aspect of history-based prefetching is how weights, i.e. likelihood values, are assigned to the edges between nodes.

In this example, the probability of access from node Nx to node Ny is computed as the ratio of number of accesses of Ny following Nx, to the total number of accesses of any other node following an access to Nx. This approach for determining probability of access is called the "likelihood probability" (p) and is described in U.S. patent application Ser. No. 13/951,662, entitled, "Systems and Methods for Adaptive Prefetching, which again is herein incorporated by reference in its entirety. The likelihood probability is defined as:

$$\text{likelihood probability } (Pxy) = \frac{\text{access count from } Nx \text{ to } Ny}{\sum_i \text{access count from } Nx \text{ to } Ni}$$

where, Ni represents the set of nodes accessed in immediate succession to node Nx in the graph.

The history graphs shown in FIGS. 4A-4D represents the I/O accesses of block ranges of data in one or more of the data storage computing devices as monitored by the caching and prefetching computing device 12 until the current time, although the access history and determination of probabilities can be executed by other types of systems and devices. The likelihood probability is a metric used to represent distance between two nodes in these graphs.

With probability values, a uniform comparison points across all the edges is provided since all values vary between 0 and 1 instead of arbitrary numbers, so better prefetching decisions can be made based on a threshold value for probability.

Although probability values as likelihood estimates are used in these examples, other approaches can be used. By way of example only, one approach is to assign a weight equal to the absolute count of accesses from one node to another, which is called the "support".

support $Sxy$=Access count from $Nx$ to $Ny$

With support, values grow over time and they are not normalized. Edges that have low access counts will tend to get ignored while making prefetching decisions if such decisions are based on preferring edges that have the largest access count amongst the outgoing edges from a node. It is not easy to be able to set a threshold value for the access count across the entire graph since access counts may vary widely.

Another factor when monitoring access history considered by the caching and prefetching computing device 12 is window history size. The window size represents the access distance between nodes to consider when deciding whether one node access is correlated to another. This is captured by the concept of semantic distance (SD) defined as: the semantic distance (SD) between node N1 and node N2 (where each node represents a distinct data block range) is the relative distance (in terms of nodes) between the access to N1 and the access to N2 in an access stream. With respect to access history, the semantic distance is a measure used to decide at what granularity to correlate two accesses, i.e. add an edge between two nodes. An exemplary access stream is shown below:

Where Nx represents a contiguous block range in an I/O request. If for example the semantic distance was set for two (SD-2) an edge in the graph would be added between any two nodes if their semantic distance is at most equal to 2. Therefore, a history graph capturing SD-2 edges would contain the edges [N4, N1], [N4, N3], [N1, N3], [N1, N5], etc. In another example the semantic distance between N1 and N2 is 4 or SD-4. Similarly, SD-1 would represent a semantic distance of one, that is, two nodes accessed in immediate succession and SD-2 would represent a semantic distance of two between node accesses. In this particular example for the access stream shown above, in FIG. 4C the edges between N4 and N3, N1 and N5, and N5 and N2 represent a semantic distance of two, i.e. SD-2, and the other illustrated edges represent a semantic distance of one, i.e. SD-1.

The choice of semantic distance for representing history has tradeoffs between the amount of metadata to maintain by the caching and prefetching computing device 12 and the granularity of history available for prefetching. With a large semantic distance SD, there are more edges in the history graph, since all nodes occurring at a semantic distance less than or equal to SD from each other in the access stream would have edges between them, thereby increasing the number of edges. At the same time, more fine-grained correlations in the history are obtained, so a node could be prefetched as soon as another node that has an edge to it is accessed, even if the semantic distance SD between them in the access stream is large. So, a history graph constructed by the caching and prefetching computing device 12 with a metric of higher semantic distance SD provides an earlier prediction during prefetch. Likewise, with a smaller semantic distance SD, there are less number of edges to maintain in the graph by the caching and prefetching computing device 12 and coarser correlations. In this particular example of the method for prefetching, a history window size of one (SD-1) is used in order to minimize number of edges in the graph and thereby reduce the amount of history graph metadata, although other values of semantic distance could be set and used by the caching and prefetching computing device 12 in other examples.

In step 104, the caching and prefetching computing device 12 determines when a prefetch trigger has occurred. In this example, a prefetch of one or more block ranges of data from a cloud storage maintained by the data storage computing devices 16(1)-16(n) to local cache 32 or a cache at another location could be triggered by the caching and prefetching computing device 12 synchronous to a read I/O request when the current read I/O request results in a cache miss. In this example, while the one or more requested block ranges of data are read from the underlying storage media at one or more of the data storage computing devices 16(1)-16(n) the caching and prefetching computing device 12 also is triggered to send a synchronous request to one or more of the data storage devices 16(1)-16(n) to fetch one or more block ranges of data in addition to those requested by the client I/O.

In another example, a prefetch of one or more block ranges of data from a cloud storage maintained by the data storage computing devices 16(1)-16(n) to local cache 32 or a cache at another location could be triggered by the caching and prefetching computing device 12 asynchronous to a read I/O request hen the current read I/O request results in a cache read. In this example, when a read I/O request is served from the cache, the caching and prefetching computing device 12 is triggered to send an asynchronous prefetch request to the storage media at one or more of the data storage computing devices 16(1)-16(n) to fetch other block ranges of data ahead of time in anticipation for subsequent client read requests from one of the client computing devices 14(1)-14(n). This prefetch is initiated out-of-band with the original read I/O request.

Accordingly, if in step 104, the caching and prefetching computing device 12 determines that a prefetch trigger has not occurred, then the No branch is taken back to step 100 as described earlier. If in step 104, the caching and prefetching computing device 12 determines that a prefetch trigger has occurred, then the Yes branch is taken to step 106 described below.

In step 106, the caching and prefetching computing device 12 determines a prefetch threshold value. As described earlier, each edge in the graph of the historical access monitored and maintained by the caching and prefetching computing device 12 is associated with a likelihood probability (p) value. The prefetch threshold and the likelihood probability values will determine the block ranges of data which will be prefetched. The prefetch threshold could be computed by the caching and prefetching computing device 12 statically or dynamically and can be used to control algorithm performance and cloud cost. In this particular example, static prefetch threshold values are used by the caching and prefetching computing device 12, although other types of threshold values could be used, such as the examples illustrated and described below.

In this example, the caching and prefetching computing device 12 uses a fixed and stored prefetch threshold value for the synchronous case and another for the asynchronous case for triggering a prefetch described above. By way of example, these fixed and stored prefetch threshold values may be set in the caching and prefetching computing device 12 based on knowledge of workload, acceptable performance guarantees and cloud cost estimates. Fixing the prefetch threshold value helps to ensure a predictable prefetch performance and a variable cloud cost. Additionally, fixed threshold values provide good cache hit ratios and prefetch efficiency for many I/O workloads. By way of example only, a fixed prefetch threshold value of 0.4 is used for synchronous prefetch requests and a fixed prefetch threshold value of 0.8 for asynchronous prefetch requests, although other values could be used for each.

In another example, the threshold value(s) used by the caching and prefetching computing device 12 could be a dynamic prefetch threshold value(s), such as an adaptive threshold value which is dynamically determined by the caching and prefetching computing device 12 to maximize performance and minimize cost In this example, the technique to compute the adaptive threshold value by the caching and prefetching computing device 12 minimizes cloud prefetch cost and I/O latency by using cache and prefetch statistics and builds a heuristic method. Additionally, in this example to determine the adaptive threshold value, the caching and prefetching computing device 12 maintains the following statistics to compute optimal prefetch threshold value: cache hit ratio; prefetch efficiency; current cloud read/write latency; current eviction rate; and cache miss rate for both demand paged and prefetched block ranges of data, although other types and numbers of factors could be monitored.

The objective of the prefetching technique can be stated as:

$$m = R_. + c^*M$$

where 'R' is average response time, 'M' is monetary cost, 'm' is prefetch objective, and 'c' is an coefficient describing the tradeoff between monetary cost and performance Performance is determined by average response time and average response time is defined by the client read workload. The goal for the caching and prefetching computing device 12 is to minimize m and achieve high cache hit rates.

'R'—the average response time can be defined as a function as follows $$R = f(\text{cache it rate, disk response time, cloud response time, eviction rate})$$

'M'—the monetary cost can be defined as a function as follows:

$$M = f(\text{prefetch object cost, prefetch efficiency, eviction rate, cloud bandwidth cost})$$

$$\text{Prefetch efficiency }(P) = \frac{\text{\# of Prefetched blocks accessed}}{\text{\# of Prefetched blocks}}$$

In this approach, the caching and prefetching computing device 12 looks for a local minimum of m by considering the effect introduced by increasing or decreasing t. An exemplary approach for calculating t with the caching and prefetching computing device 12 is described below:

First, the caching and prefetching computing device 12 starts with an initial value for threshold −'t'. Based on the current statistics on the performance and monetary cost, the caching and prefetching computing device 12 determines whether to increase or decrease the 't' value. Next the caching and prefetching computing device 12 gathers statistics within a configured time window or other time period. When the statistics change, the caching and prefetching computing device 12 will look for a new 't' value. If 'm' has been decreased because 't' has increased, then the caching and prefetching computing device 12 will increase 't' further. Otherwise, the caching and prefetching computing device 12 will decrease 't' as the response to the increased cost m. In turn, the caching and prefetching computing device 12 gets the dynamic optimal threshold value (t) over time.

Although one example of an approach for determining an adaptive prefetch threshold is illustrated and described above, other types of approaches can be used, such as the one based on an AMP algorithm which rewards accuracy in prediction and can efficiently recognize multiple workload streams and is disclosed in U.S. patent application Ser. No. 13/951,662, entitled, "Systems and Methods for Adaptive Prefetching, which again is herein incorporated by reference in its entirety.

In step 108 the caching and prefetching computing device 12 identifies from an initial or starting data block in an overall data block a candidate data block from one of one or more immediate successor data blocks that has a historical access probability value from the initial accessed data block which is higher than a historical access probability value for each of the other immediate successor data blocks and is above a threshold value.

In step 110, the caching and prefetching computing device 12 determines whether to repeat the identifying. If in step 110 the caching and prefetching computing device 12 determines to repeat the identifying, then the Yes branch is taken back to step 108. In this example, the identifying in step 108 is repeated until a next identified candidate data block has a historical access probability value below the threshold value. Additionally, when the caching and prefetching computing device determines the identifying needs to be repeated, the one or more next immediate successor data blocks in the identifying step are determined from the previously identified candidate data block. Further, the historical access probability value for each of the next immediate successor data blocks is determined by the caching and prefetching computing device 12 from the originally accessed data block. If in step 110 the caching and prefetching computing device 12 determines not to repeat the identifying, then the No branch is taken to step 112. An illustrative example of identifying a candidate block range of data and repeating the identifying will now be described below.

In this particular example, the caching and prefetching computing device 12 uses a "Balanced Expansion" approach, as disclosed in a dissertation entitled, "Predictive Data Grouping Using Successor Prediction" at the University of California at Santa Cruz on September of 2002, which is herein incorporated by reference in its entirety, to identify one or more candidate block ranges of data to prefetch as describe in greater detail below. Assume node N1 is the initial or starting node accessed in the graph maintained by the caching and prefetching computing device 12 for purposes of prefetching. Start from the node N1 and among its successor nodes, pick the node (say node N2) with the highest probability of access from the node N1. Add this node to the list of candidate nodes. Then, again look for a node with the highest probability of access from N1 or from any of the candidate nodes in the list (N2 in this case), and add this node to the list of candidates. Keep repeating the process until the highest probability value falls below a threshold prefetch probability value as described earlier. The list of candidates at that stage constitutes the set of nodes or candidate block ranges of data which can be prefetched by the caching and prefetching computing device 12 for cache.

A more detailed example of the caching and prefetching computing device 12 using balanced expansion as the method for traversing the graph to find candidate nodes will now be described. The caching and prefetching computing device 12 starts traversal from an accessed node say N1, and maintain two sets: the traverse set T, which initially contains the immediate successors (those connected by a direct outgoing edge) of node N1, and the candidate set C, which is initially empty. Considering the example shown in FIG. 4D, $T=\{[N3,0.6],[N4,0.4]\}$ $C=\{\}$ Then the caching and prefetching computing device 12 keeps repeating the following process: select the node N from T which has the highest likelihood of being accessed from node N1. In this example, this is calculated by multiplying the probabilities along all the edges of the shortest path from N1 to N. Next, the caching and prefetching computing device 12 removes N from T and adds N to C. Next, the caching and prefetching computing device 12 adds all the immediate successors of N into T, and again selects the highest likelihood node in T and move it to C.

Figure 4D:
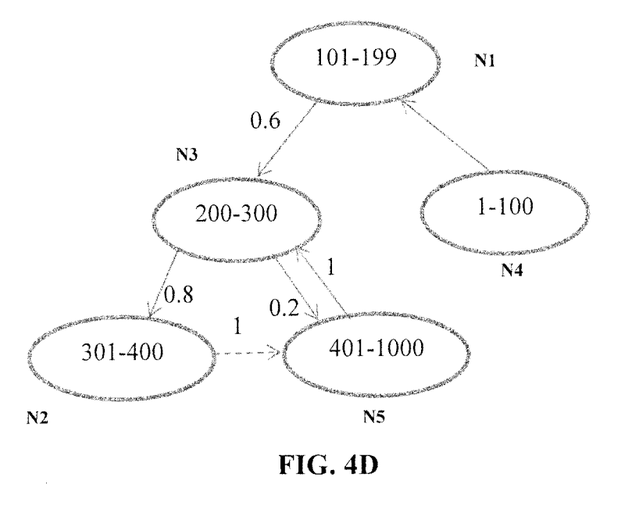

So, after the first iteration, T and C would be as follows:

$T=\{[N4,0.4],[N2,0.48],[N5,0.12]\}$:

$C=\{[N3,0.6]\}$

Node N3 was picked from T and added to C, since its probability (0.6) of access from N1 was higher than that of N4 (0.4). The caching and prefetching computing device 12 also added the immediate successors of N3, i.e. nodes N2 and N5 to the set T along with their path probabilities of being accessed from node N1, which is simply the product of the probabilities along the shortest path to these nodes from N1.

The caching and prefetching computing device 12 repeats this process until the likelihood is below a threshold, or until C's size reaches a limit. In the end, set C contains all the nodes that we will now prefetch. So, in the example above, the next node with highest likelihood of access in T, N2, is selected from T and moved to C.

$T=\{[N4,0.4],[N5,0.12]\}$ $C=\{[N3,0.6],[N2,0.48]\}$

If the probability likelihood threshold is 0.45, then our candidate selection process stops here since all the nodes in T have access probabilities lower than this value. The set C is the set of nodes we will prefetch. In other embodiments, other methods could also be used Although in this particular example, a "Balanced Expansion" approach is used by the caching and prefetching computing device 12, other types and numbers of approaches could be used, such as a Depth-First-Search (DFS), a Breadth-First-Search (BFS), or clustering by way of example only. For example, clustering could be used to divide the graph into different clusters, such that nodes in the same cluster are the ones being accessed frequently together. With this, the graph for prefetching could be traversed based on clusters, i.e. localize traversal to within a cluster. A cluster of strongly connected components could even be collapsed into one node, to reduce the graph size.

In step 112, the caching and prefetching computing device 12 determines whether there is space in cache 32. If in step 112, the caching and prefetching computing device 12 determines there is no space in cache, then the No branch is taken to step 114.

In step 114, the caching and prefetching computing device 12 determines which of one or more of the fetched candidate data blocks. In this example, the caching and prefetching computing device 12 uses a method based on first principles which tries to maximize prefetch gain and minimize eviction loss to determine which of one or more of the fetched candidate data blocks to evict. The first principles states that a new block range of data should be prefetched and a candidate block range of data in cache 32 should be evicted if the expected prefetch gain is higher than keeping the eviction candidate (expected eviction loss). An example of the formulas of calculating expected prefetch gain and eviction loss used by the caching and prefetching computing device 12 are listed as below, although other approaches could be used:

expected prefetch gain=probability of accessing the prefetch candidate within its lifetime*current cloud latency expected eviction loss=probability of accessing evict on candidate before accessing the prefetch block*(expected cloud latency+$c$*cost of reading the block form cloud)

where, a) probability of access a prefetched block is prefetch efficiency and b) probability of wrong eviction is the statistic maintained by the data storage computing devices 16(1)-16($n$).

If in step 112, the caching and prefetching computing device 12 determines there is space in cache, then the Yes branch is taken to step 116. In step 116, the caching and prefetching computing device fetches the one or more identified candidate data blocks with the historical access probability value above the threshold value from one or more of the data storage computing devices 16(1)-16($n$) for storage in cache, although the data could be fetched from other types and numbers of storage systems. In step 118, this example of the method for prefetching one or more candidate data blocks ends.

Accordingly, as illustrated and described with reference to the examples herein, this technology combines access history and sequentiality for more intelligent prefetching. This technology is able to leverage I/O access history to discover hidden patterns and intelligent prefetching techniques to overcome prior issues with prefetching. Further, this technology reduces prefetch cost and prevents limited resources in a system from caching data that may not be immediately used.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method comprising:
identifying, with a computing device, at least one candidate data block from one of one or more immediate successor data blocks that has a historical access probability value from an initially accessed data block which is higher than a historical access probability value for each of the other immediate successor data blocks and is above a prefetch threshold value that comprises a first static threshold value for a synchronous request for fetching associated with a current cache miss and a second static threshold value for an asynchronous request for fetching associated with a cache read;

repeating, with the computing device, the identifying until at least one next identified candidate data block has a historical access probability value below the prefetch threshold value, wherein each of the repeating of the identifying is performed with respect to one or more next immediate successor data blocks from the previously identified at least one candidate data block and with a historical access probability value for each of the next immediate successor data blocks that is determined from the initially accessed data block; and fetching, with the computing device, the one or more identified candidate data blocks with the historical access probability value above the prefetch threshold value from one or more storage media for storage in cache.

2. The method as set forth in claim 1, further comprising:
obtaining, with the computing device, historical access data between data blocks; and
determining, with the computing device, a probability of access value between the data blocks which are within a sequentially accessed semantic distance of each other.

3. The method as set forth in claim 1, further comprising determining, with the computing device, when a prefetch trigger has occurred, wherein the identifying begins when the determining indicates an occurrence of the prefetch trigger.

4. The method as set forth in claim 3, wherein the prefetch trigger comprises at least one of a cache miss or a cache read.

5. The method as set forth in claim 1, further comprising:
determining, with the computing device, when to evict one or more of the prefetched candidate data blocks in the cache based on one or more replacement characteristics; and
evicting, with the computing device, the one or more of the prefetched candidate data blocks in response to said determining.

6. The method as set forth in claim 5, wherein the one or more replacement characteristics comprise at least a replacement candidate prefetch gain value and an eviction loss value.

7. A computing device comprising:
at least one processor; and
at least one memory coupled to the processor configured to execute programmed instructions stored in the memory comprising:
identifying at least one candidate data block from one of one or more immediate successor data blocks that has a historical access probability value from an initially accessed data block which is higher than a historical access probability value for each of the other immediate successor data blocks and is above a prefetch threshold value that comprises a first static threshold value for a synchronous request for fetching associated with a current cache miss and a second static threshold value for an asynchronous request for fetching associated with a cache read;
repeating the identifying until at least one next identified candidate data block has a historical access probability value below the prefetch threshold value, wherein each of the repeating of the identifying is performed with respect to one or more next immediate successor data blocks from the previously identified at least one candidate data block and with a historical access probability value for each of the next immediate successor data blocks that is determined from the initially accessed data block; and
fetching the one or more identified candidate data blocks with the historical access probability value above the prefetch threshold value from one or more storage media for storage in cache.

8. The device as set forth in claim 7, wherein the processor is further configured to execute programmed instructions stored in the memory further comprising:
obtaining historical access data between data blocks; and
determining a probability of access value between the data blocks which are within a sequentially accessed semantic distance of each other.

9. The device as set forth in claim 7, the processor is further configured to execute programmed instructions stored in the memory further comprising determining when a prefetch trigger has occurred, wherein the identifying begins when the determining indicates an occurrence of the prefetch trigger.

10. The device as set forth in claim 9 wherein the prefetch trigger comprises at least one of a cache miss or a cache read.

11. The device as set forth in claim 7, the processor is further configured to execute programmed instructions stored in the memory further comprising:
determining when to evict one or more of the prefetched candidate data blocks in the cache based on one or more replacement characteristics; and
evicting the one or more of the prefetched candidate data blocks in response to said determining has indicated.

12. The device as set forth in claim 11, wherein the one or more replacement characteristics comprise at least a replacement candidate prefetch gain value and an eviction loss value.

13. A non-transitory computer readable medium having stored thereon instructions for managing fetching comprising executable code which when executed by a processor, causes the processor to perform steps comprising:
identifying at least one candidate data block from one of one or more immediate successor data blocks that has a historical access probability value from an initially accessed data block which is higher than a historical access probability value for each of the other immediate successor data blocks and is above a prefetch threshold value that comprises a first static threshold value for a synchronous request for fetching associated with a current cache miss and a second static threshold value for an asynchronous request for fetching associated with a cache read;
repeating the identifying until at least one next identified candidate data block has a historical access probability value below the prefetch threshold value, wherein each of the repeating of the identifying is performed with respect to one or more next immediate successor data blocks from the previously identified at least one candidate data block and with a historical access probability value for each of the next immediate successor data blocks that is determined from the initially accessed data block; and
fetching the one or more identified candidate data blocks with the historical access probability value above the prefetch threshold value from one or more storage media for storage in cache.

14. The medium as set forth in claim 13, wherein the steps further comprise:
   obtaining historical access data between data blocks; and
   determining a probability of access value between the data blocks which are within a sequentially accessed semantic distance of each other.

15. The medium as set forth in claim 13, wherein the steps further comprise determining when a prefetch trigger has occurred, wherein the identifying begins when the determining indicates an occurrence of the prefetch trigger.

16. The medium as set forth in claim 15, wherein the prefetch trigger comprises at least one of a cache miss or a cache read.

17. The medium as set forth in claim 13, further comprising:
   determining when to evict one or more of the prefetched candidate data blocks in the cache based on one or more replacement characteristics; and
   evicting the one or more of the prefetched candidate data blocks in response to said determining.

18. The medium as set forth in claim 17, wherein the one or more replacement characteristics comprise at least a replacement candidate prefetch gain value and an eviction loss value.

\* \* \* \* \*